United States Patent Office 3,555,674
Patented Jan. 19, 1971

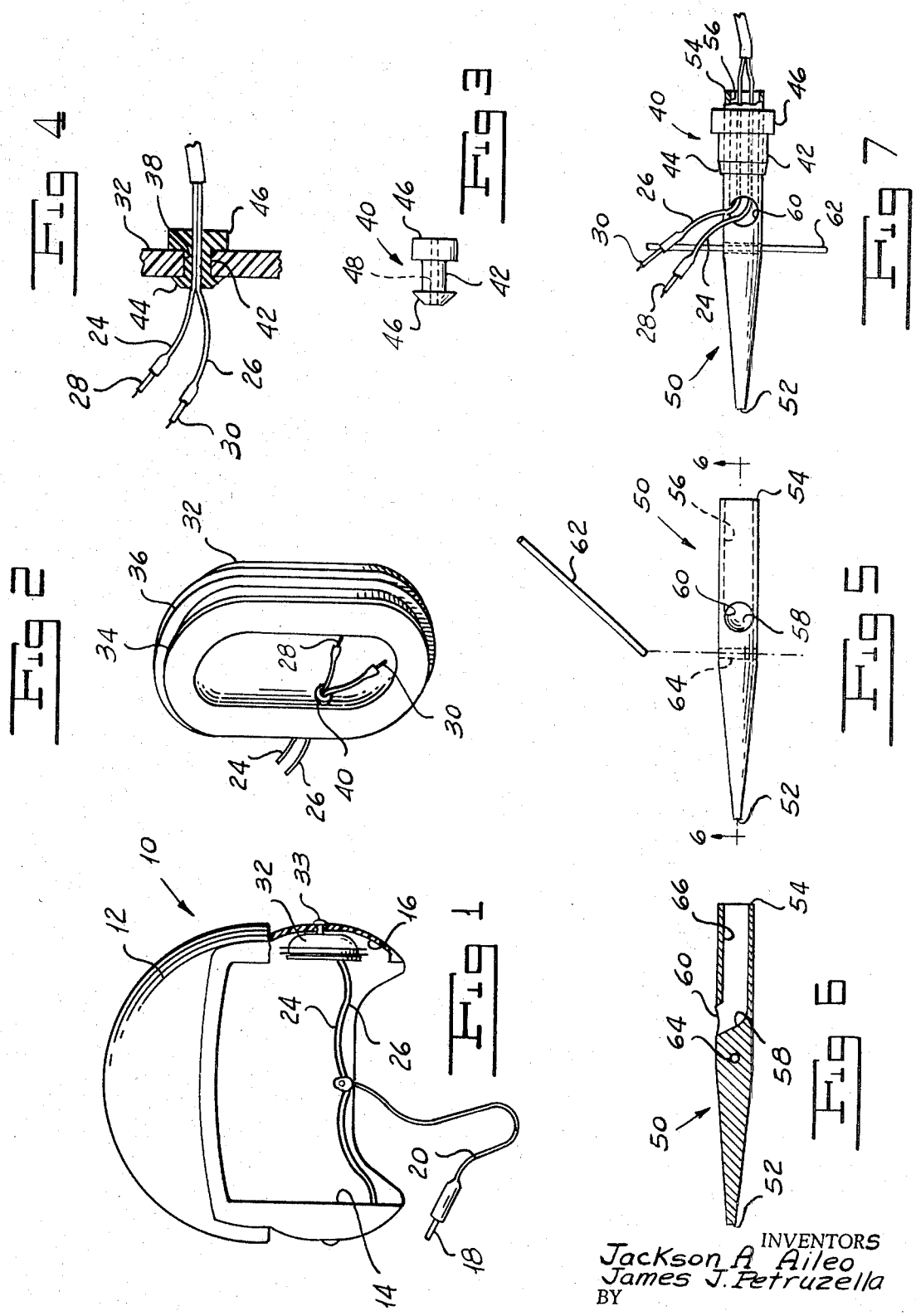

3,555,674
TOOL AND METHOD OF USING THE SAME FOR INSERTING LEADS THROUGH RESILIENT GROMMETS
Jackson A. Aileo and James J. Petruzella, Carbondale, Pa., assignors to Gentex Corporation, New York, N.Y., a corporation of Delaware
Filed May 17, 1968, Ser. No. 730,084
Int. Cl. H01r 9/00; B23p 11/02, 19/04
U.S. Cl. 29—630      8 Claims

ABSTRACT OF THE DISCLOSURE

A tool and method of using the same for facilitating the operation of passing electrical leads through resilient grommets which are used to conduct the leads in sound-tight relationship through the wall of a sound attenuating helmet earcup. The tool is an elongated tapered body having an axial bore extending from its larger end to a point intermediate the ends of the body, at which point a slanted wall leads outwardly to an opening in the side of the body. In use of the device, the grommet is slid over the body from its smaller end to a point beyond the side wall opening. The leads are then inserted into the bore until the plugs on the ends of the lead are guided out through the side opening by the slanted wall. The grommet is then slipped off the enlarged end of the body and onto the leads. A removable pin extending across the longitudinal axis of the body may be employed to facilitate the operation just described. The body may be lubricated to assist in sliding the grommet thereon. After the grommet has been slipped off the body onto the leads, the leads are passed through the cup wall opening and the grommet is pushed into the opening to complete the assembly.

BACKGROUND OF THE INVENTION

Helmets, and particularly those helmets which are used by aircraft pilots, are provided with sound attenuating cups for housing the pilot's headphones. Electrical connections to the headphones are made by leads passing through the wall of the sound attenuating cup. These connections should be made so as not to affect the soundproof integrity of the cup. In an effort to achieve this result in the prior art, grommets of resilient material are provided. The grommets are provided with a central portion having a reduced diameter which is approximately equal to the hole size and with a length which is approximately equal to the thickness of the cup wall. A tapered flange at one end facilitates insertion of the grommet and a backup flange is provided at the other end. The axial bore of the grommet is made very small to ensure that the leads will be so tightly held as to maintain the soundproof integrity of the assembly.

In applying the leads to the cup they must first be inserted through the grommet before the grommet is assembled in the cup wall hole. Owing to the fact that the grommet bore is extremely small, difficulty has been experienced in the prior art in performing this operation. In an effort to overcome this problem the operators first slit the grommet axially so as to open up the bore. The grommet is then spread apart at the slit and the leads are placed in the bore. When that has been done, the grommet is inserted in the wall of the earcup. The defect of this mode of assembling the leads and the grommet is that it destroys the soundproof integrity of the assembly. That is, these split grommets are not sound-tight and noise readily filters through the wall at the point at which the grommet is assembled on the cup. As a matter of fact, we have discovered that if a cup provided with such a lead-carrying grommet is filled with water, the water will leak through the grommet.

We have invented a tool for assembling leads in grommets which overcomes the defects of methods of the prior art of assembling leads in grommets. Our tool avoids the necessity for splitting the grommet prior to assembling the leads in the grommet bore. Our tool permits us to make a sound-tight seal between the leads and the sound attenuating cup wall. Our tool permits leads to be passed through the wall of a sound attenuating cup without destroying the soundproof integrity of the assembly. Our tool permits leads to be assembled through grommets in a rapid and expeditious manner. Our tool is simple and inexpensive to construct for the result achieved thereby.

SUMMARY OF THE INVENTION

One object of our invention is to provide a tool for assembling leads through grommets.

Another object of our invention is to provide a tool for assembling leads through grommets without the necessary of splitting the grommet.

A further object of our invention is to provide a tool which permits leads to be passed through the wall of a sound attenuating cup in soundproof relationship thereto.

Still another object of our invention is to provide a tool for inserting leads through grommets, which tool is simple and inexpensive to construct. Yet another object of our invention is to provide a method for passing electrical conductors through an opening in a resilient grommet.

Other and further objects of our invention will appear from the following description.

In general our invention contemplates the provision of a tool for inserting leads through grommets in which a tapered body has a longitudinal bore which extends from the larger end of the body to a point intermediate the ends of the body, at which point a slanted wall leads to an opening in the side of the body. To assemble leads on a grommet, the grommet is slipped over the body from the smaller end thereof to a point beyond the side opening so as to be stretched over the body. The leads are then inserted into the body bore through the larger end of the body until the ends thereof are directed by the slanted wall outwardly of the body. The grommet is then moved off the larger end of the body onto the leads with a removable crosspin provided for facilitating this operation. The tool is then assembled and the grommet carrying the leads is ready for assembly in the earcup. It may be desirable to lubricate the tool.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a front elevation of a flier's helmet with parts removed and with another part broken away.

FIG. 2 is a perspective view of a sound attenuating earcup provided with leads extending through a grommet in the wall of the cup.

FIG. 3 is a side elevation of a grommet through which leads are to be inserted.

FIG. 4 is a fragmentary sectional view illustrating a portion of a sound attenuating earcup wall carrying a grommet through which leads pass.

FIG. 5 is a top plan view of our tool for inserting leads through grommets.

FIG. 6 is a sectional view of the tool shown in FIG. 5 taken along the line 6—6 of FIG. 5.

FIG. 7 is a top plan view our our tool with a part broken away and showing the relationship of the tool to a grommet and leads in use of the tool to assemble the grommet on the leads.

DESCRIPTION OF THE PREFERRED EMBODIMENT

Referring now to the drawings, we have illustrated a pilot's helmet, indicated generally by the reference character 10, which may be of any suitable construction known in the art. For example, helmets of this type usually are provided with a visor housing 12 and with recesses 14 and 16. A main plug 18 is adapted to connect a lead 20 to the receiving equipment (not shown). From the main lead 20, subleads 24 and 26 carrying plugs 28 and 30 are adapted to connect the line 20 to one of the headphones (not shown) located within a sound attenuating earcup 32 held in position within one of the recesses 14 and 16 by any suitable means, such as by a screw 33.

One of the grommets 40 which we use in passing the leads 24 and 26 through the wall of the earcup 32 includes a central portion 42 having a diameter which is approximately the size of the opening 38 in the wall of earcup 32. A tapered flange 44 at one end of the portion 42 facilitates entry of the grommet into the opening 38 and together with a backup flange 46 at the other end of the central portion 42 holds the grommet in position in the opening 38. The grommet 40 has a central bore 48 which is relatively small as compared with the overall thicknesses of the leads 24 and 26 so as to hold the leads tightly to prevent any sound from travelling through the wall of the cup 32. Owing to the fact that this bore 48 is very small and because of the enlargements on the ends of the leads adjacent the plugs 28 and 30, it has heretofore been necessary to split the grommet longitudinally in order to assemble the leads in the bore. The grommet 40 is made of any suitable resilient material such, for example, as natural or synthetic rubber.

Our tool, indicated generally by the reference character 50, is tapered from a relatively narrow or small end 52 to a larger end 54. We may form our tool 50 from any suitable material such, for example, as steel, brass, aluminum or plastic. We provide the tool 50 with a bore 56 extending from the larger end 54 to a point intermediate the ends 52 and 54. At the end of the bore we provide a wall 58 which is slanted toward the narrower end 52 of the tool for a reason which will be explained hereinafter. Wall 58 forms guide means leading from bore 56 to an opening 60 in the side of the tool 50.

We provide the tool with a transverse bore 64 between the opening 60 and the smaller end 52 of the tool. Bore 64 removably receives a pin 62 which provides a hand grip for a reason which will be described hereinafter.

In use of our tool 50 to assemble a grommet 40 on the leads 24 and 26, we first slide the grommet 40 over the smaller end 52 of the tool 50 to a position beyond the opening 60. It will readily be appreciated that the grommet 40 is stretched considerably in the course of this operation. In order to facilitate the operation of sliding the grommet onto the tool 50 in the manner described, we may lubricate the tool with a suitable lubricant such, for example, as silicone. Alternatively, where the grommets are formed of a synthetic rubber such, for example, as neoprene, they may first be boiled in water before being slipped on the tool. It will readily be appreciated that the pin 62 is removed when the grommet is being pushed upon the tool.

Once the grommet has been moved into position on the tool, as illustrated in FIG. 7, the plug ends of the leads 24 and 26 are inserted in the bore 56 and are pushed therealong until the plugs 28 and 30 strike the wall 58. As the leads are pushed further, wall 58 directs the leads outwardly through the opening 60. With the parts in this position, the pin 62 is inserted in the bore 64 and grasping the pin with one hand and the grommet in the other, the grommet 40 is slid off the larger end 54 and contracts on the leads 24 and 26 so as to provide a tight seal therewith. If desired, we may apply an adhesive or an elastomer to the leads 24 and 26 at the location at which they are to receive the grommet to ensure that a high seal is provided.

Once the grommet has been assembled on the leads in the manner described, leads 24 and 26 are withdrawn from the tool. Next the grommet is to be assembled in the opening 38. To achieve this operation the leads 24 and 26 first are passed through the opening plug end first. In assembling the grommet 40 on the leads 24 and 26, the tapered flange 44 of the grommet may be either adjacent to or remote from the plug ends of the leads depending upon which way it is preferred to assemble the grommet in the opening 38. Which ever way the grommet faces, the leads are passed through the opening so as to bring the tapered flange 44 to the hole first. In order to facilitate the operation of assembling the grommet 40 in the hole 38, we may lubricate the tapered flange 44. After the flange 44 has been pushed through the opening, the central portion 42 will be in the hole and the flanges 44 and 46 in engagement with the surfaces of the wall of the earcup 32. Owing to the relative dimensions of the grommet with relation to the wall of the earcup and the hole 38, a tight seal is provided.

While we have described a particular use of our tool in assembling a grommet carrying electrical leads in a sound attenuating cup, it will readily be appreciated that it has equal utility in any other instance in which leads are to be assembled in extremely tight relationship to a grommet.

It will be seen that we have accomplished the objects of our invention. We have provided a tool for facilitating the assembly of a grommet on leads. Our tool does away with the necessity of splitting the grommet for assembly of the leads therewith. It permits us to form such a tight seal between the leads and a sound attenuating earcup wall as to maintain the sound attenuating integrity of the cup. It is simple in construction and operation. It is inexpensive to manufacture.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A tool for facilitating the operation of inserting electrical lead means through a resilient grommet formed with an opening which is smaller than the size of said lead means including an elongated straight body tapering from a larger end thereof toward a smaller end thereof, said smaller end having a diameter less than the size of said grommet opening to permit entry of said smaller end into said opening, said larger end having a diameter greater than the size of the grommet opening to stretch said grommet in response to movement thereof along said body following insertion of said smaller end into said grommet opening, said body formed with a longitudinal bore extending from said larger end to a point intermediate said ends, said bore having a diameter greater than the size of said lead means to permit said lead means to be inserted into the bore through said larger end, an opening in the wall of said bore at said point and a guide surface at said point leading from said bore to said opening to direct the ends of lead means inserted into said bore through said larger end out of said body through said opening.

2. A tool as in claim 1 in which said body is generally conical.

3. A tool as in claim 1 in which said guide wall is a wall at the end of said body bore, said wall being inclined from said bore toward said opening in a direction toward the smaller end of the body.

4. A tool as in claim 1 including a detachable hand grip carried by said body between said opening and said smaller end.

5. A tool as in claim 1 in which said body is further formed with a transverse bore between said opening and said smaller end and a pin removably carried in said transverse bore.

6. A method of inserting leads through a resilient grommet including the steps of stretching said grommet radially by slipping it over the smaller end of a generally conical tapered body and toward the larger end of the body to a point beyond a side opening leading into a bore extending from the larger end, passing the ends of said leads through said bore and out through said side opening and then slipping said grommet off the larger end of the body and onto said leads.

7. A method as in claim 6 including the step of applying adhesive to said leads before slipping said grommet off said larger end.

8. A method as in claim 6 including the step of lubricating said body.

References Cited
UNITED STATES PATENTS

| | | | |
|---|---|---|---|
| 1,161,194 | 11/1915 | Cook | 29—630A |
| 3,280,435 | 10/1966 | Nasworthy | 29—433 |
| 3,001,270 | 9/1961 | Friedman | 29—241 |
| 3,279,044 | 10/1966 | Roper | 29—206 |

THOMAS H. EAGER, Primary Examiner

U.S. Cl. X.R.

29—203, 206, 241, 433, 450